US009615379B2

(12) United States Patent
Zhao et al.

(10) Patent No.: US 9,615,379 B2
(45) Date of Patent: Apr. 4, 2017

(54) SCHEDULING REQUEST TRANSMISSION METHOD AND APPARATUS FOR DECOUPLED DOWNLINK-UPLINK

(71) Applicant: Telefonaktiebolaget L M Ericsson (publ), Stockholm (SE)

(72) Inventors: Zhenshan Zhao, Beijing (CN); Qianxi Lu, Beijing (CN)

(73) Assignee: Telefonaktiebolaget LM Ericson (publ), Stockholm (SE)

( * ) Notice: Subject to any disclaimer, the term of this patent is extended or adjusted under 35 U.S.C. 154(b) by 49 days.

(21) Appl. No.: 14/437,582

(22) PCT Filed: Oct. 30, 2012

(86) PCT No.: PCT/CN2012/001472
§ 371 (c)(1),
(2) Date: Apr. 22, 2015

(87) PCT Pub. No.: WO2014/067028
PCT Pub. Date: May 8, 2014

(65) Prior Publication Data
US 2015/0282204 A1  Oct. 1, 2015

(51) Int. Cl.
*H04W 4/00* (2009.01)
*H04W 72/12* (2009.01)
(Continued)

(52) U.S. Cl.
CPC ....... *H04W 72/1263* (2013.01); *H04L 1/1671* (2013.01); *H04L 1/1854* (2013.01);
(Continued)

(58) Field of Classification Search
CPC ... H04L 1/1671; H04L 1/1812; H04L 1/1854; H04L 5/0055; H04W 72/0406; H04W 72/1263; H04W 72/1284
See application file for complete search history.

(56) References Cited

U.S. PATENT DOCUMENTS

| 8,743,783 B2 * | 6/2014 | Han | H04L 1/0031 370/328 |
| 9,084,243 B2 * | 7/2015 | Yang | H04L 1/0027 |
| 2011/0228877 A1 | 9/2011 | Han et al. | |

FOREIGN PATENT DOCUMENTS

CN  102238737 A  11/2011
EP  2 333 985  6/2011
(Continued)

OTHER PUBLICATIONS

Supplementary European Search Report for Application No. EP 12 88 7800—May 17, 2016.
(Continued)

Primary Examiner — Kan Yuen
(74) Attorney, Agent, or Firm — Baker Botts, LLP

(57) ABSTRACT

This disclosure provides a Scheduling Request transmission method (10) for decoupled downlink-uplink in heterogeneous network, where the heterogeneous network comprises at least two cells in charge of downlink and uplink transmission separately and connected with any backhaul, the method comprising: determining (11) a positive Data Scheduling Request, D-SR, is to be transmitted in a current D-SR's subframe together with HARQ-ACK/NACK on PUCCH using PUCCH format 1a/1b/3; transmitting (12) a HARQ-ACK/NACK in the current D-SR's subframe on PUCCH together with a negative D-SR using PUCCH format 1/1a/1b or format 3 while transmitting a Scheduling Request, SR, in a next SR's subframe subsequent to the current D-SR's subframe. In this method, the Scheduling Request (SR) of the UEs can be correctly detected in the Pico base station to trigger UL transmission in decoupled UL/DL scenario in various case and any kinds of backhaul can be supported.

15 Claims, 2 Drawing Sheets

(51) Int. Cl.
   H04L 5/00       (2006.01)
   H04W 72/04      (2009.01)
   H04L 1/16       (2006.01)
   H04L 1/18       (2006.01)
(52) U.S. Cl.
   CPC ....... *H04L 5/0055* (2013.01); *H04W 72/0406* (2013.01); *H04W 72/1284* (2013.01); *H04L 1/1812* (2013.01)

(56) References Cited

FOREIGN PATENT DOCUMENTS

| WO | WO 2009/056599 | 5/2009 |
| WO | WO 2012/136269 | 10/2012 |
| WO | WO 2014/063298 | 5/2014 |

OTHER PUBLICATIONS

Extended European Search Report including the European search opinion for Application No. EP 12 88 7800.6-1851/2915391—May 17, 2016.
PCT Notification of Transmittal of the International Search Report and the Written Opinion of the International Searching Authority, or the Declaration for International application No. PCT/CN2012/001472, Jul. 25, 2013.
PCT International Search Report fo International application No. PCT/CN2012/001472, Aug. 1, 2013.
3GPP TS 36.213 V10.2.0; 3rd Generation Partnership Project; Technical Specification Group Radio Access Network; Evolved Universal Terrestrial Radio Access (E-UTRA); Physical layer procedures (Release 10), Jun. 2011.

* cited by examiner

SCHEDULING REQUEST TRANSMISSION METHOD AND APPARATUS FOR DECOUPLED DOWNLINK-UPLINK

PRIORITY

This nonprovisional application is a U.S. National Stage Filing under 35 U.S.C. §371 of International Patent Application Serial No. PCT/CN2012/001472, filed Oct. 30, 2012 and entitled "SCHEDULING REQUEST TRANSMISSION METHOD AND APPARATUS FOR DECOUPLED DOWNLINK-UPLINK."

TECHNICAL FIELD

The invention generally relates to wireless communication technologies, in particular to a Scheduling Request transmission method and apparatus for decoupled downlink-uplink (DL-UL) in heterogeneous networks.

BACKGROUND

In 3GPP-LTE advanced, Coordinated Multi-Point Transmission (CoMP) is proposed as a key technology for further improving cell-edge performance. For uplink CoMP, one of the focused scenarios is the heterogeneous network scenario defined by 3GPP. A key feature in this scenario is the Decoupled DL-UL for some UEs, e.g., the UE as shown in FIG. 1 where an exemplary decoupled DL-UL scenario in the heterogeneous network is illustrated. In particular, as the Macro cell A has much higher transmission power than the Pico cell B, the coverage is different for the Macro cell A and the Pico cell B. For the UE located in the Macro cell coverage but at the coverage boundary between the Macro cell A and the Pico cell B, the received downlink signal from the Macro cell A is stronger than that from the Pico cell B. Hence the UE is associated with the Macro cell A and receives downlink signals from the Macro cell A. While for the uplink, since the UE is closer to the Pico cell B than the Macro cell A, it is better to select Pico cell B as the reception point, in order to reduce the transmit power of the UE and the interference to other normal UEs in the Pico cell B. Therefore, for this UE, the downlink serving cell is the Macro cell A but the uplink serving cell is the Pico cell B.

In the decoupled DL-UL scenario, it is up to Macro base station to manage DL transmission, yet Pico base station is in charge of UL transmission. If any backhaul connection (good, less than ~0.5 ms latency; medium, ~5 ms latency; poor, ~50-100 ms latency) between the Macro base station and the Pico base station is considered, for example, when a slow backhaul connection is used, it is hard to support instantaneous information exchange between Macro base station and Pico base station, thus, DL-UL separation is implemented between Macro base station (DL) and Pico base station (UL). Due to this, physical uplink control channel (PUCCH) format 1a/1b/2/2a/2b/3 (including HARQ-ACK/NACK(A/N) and/or CQI) corresponding to the downlink transmission is to be received by Macro base station, and the Transmission power of UE shall be large enough to reach the Macro base station. While the scheduling request (D-SR and RA-SR) using PUCCH format 1 corresponding to the UL transmission is to be received by the Pico base station, and it shall reach the Pico base station, which means a low Transmission power of the UE to reduce the interference to other normal UEs (i.e., of which both DL and UL connections are served by the Pico cell) in the Pico cell.

If there is only D-SR transmitted in one subframe, it is OK for the Pico base station to receive it. However, 1) if 1 or 2 bits HARQ-ACK/NACK feedback and positive D-SR are to be transmitted in the same subframe, HARQ-ACK/NACK will be transmitted on D-SR's resource using PUCCH format 1a/1b; or 2) if up to 10-bit HARQ-ACK/NACK and 1-bit positive D-SR for FDD or 20-bit HARQ-ACK/NACK and 1-bit positive D-SR for TDD are transmitted in the same subframe, HARQ-ACK/NACK and D-SR are jointly encoded and PUCCH format 3 is used. Both PUCCH format 1a/1b and format 3 have to reach Macro base station, which means the Transmission power will be larger than that necessary to reach the Pico base station, so that it will 1) cause a strong interference to the D-SR monitoring of other normal UEs in the Pico cell in format 1a/1b case above. 2) the Pico base station will fully miss the D-SR information in format 3 as described above. Because the Pico base station doesn't know there is HARQ-ACK/NACK in this subframe, it will only monitor the D-SR resource instead of the resource of format 3.

SUMMARY

This disclosure aims to provide a new SR transmission method and apparatus in decoupled DL-UL scenario with any backhaul, thus preferably mitigate, alleviate or eliminate one or more of the above mentioned disadvantages singly or in any combination.

In one aspect of the invention, there is provided a Scheduling Request transmission method for decoupled downlink-uplink in heterogeneous network, where the heterogeneous network comprises at least two cells in charge of downlink and uplink transmission separately and connected with any backhaul, the method comprising: determining a positive Data Scheduling Request, D-SR, is to be transmitted in a current D-SR's subframe together with HARQ-ACK/NACK on PUCCH using PUCCH format 1a/1b/3; transmitting a HARQ-ACK/NACK in the current D-SR's subframe on PUCCH together with a negative D-SR using PUCCH format 1/1a/1b or format 3, while transmitting a Scheduling Request, SR, in a next SR's subframe subsequent to the current D-SR's subframe.

In a second aspect of the invention, there is further provided a Scheduling Request transmission apparatus for decoupled downlink-uplink in heterogeneous network, where the heterogeneous network comprises at least two cells in charge of downlink and uplink transmission separately and connected with any backhaul, the apparatus comprising: a determining module for determining a positive Data Scheduling Request, D-SR, is to be transmitted in a current D-SR's subframe together with HARQ-ACK/NACK on PUCCH using PUCCH format 1a/1b/3; a transmitting module for transmitting a HARQ-ACK/NACK together with a negative D-SR in the current D-SR's subframe on PUCCH using PUCCH format 1/1a/1b or format 3, while transmitting a Scheduling Request, SR, in a next SR's subframe subsequent to the current D-SR's subframe.

In a third aspect of the invention, there is also provided user equipment including the apparatus according to the embodiments of the invention.

In a fourth aspect of the invention, there is also provided a computer program product comprising a set of computer executable instructions stored on a computer readable medium, configured to implement the method according to the embodiments of the invention.

In a fifth aspect of the invention, there is also provided a computer-readable medium having stored thereon a computer program product comprising a set of computer executable instructions which when executed by a processor in a computing device, causes the computing device to implement the method according to the embodiments of the invention.

Various embodiments of the invention may bring one or more of the following advantages, for example, the Scheduling Request (SR) of the UEs can be correctly detected in the Pico cell and the interference to the Pico cell caused by the PUCCH transmitted to the Macro cell can be reduced in the decoupled DL-UL scenario. Further, the embodiments can support any kinds of backhaul.

BRIEF DESCRIPTION OF THE DRAWINGS

The features and advantageous of the present invention will be more apparent from the following exemplary embodiments of the invention illustrated with reference to the accompanied drawings, in which.

DETAILED DESCRIPTION

Embodiments of the invention will be described thoroughly hereinafter with reference to the accompanied drawings. It will be apparent to those skilled in the art that the invention may, however, be embodied in many different forms and should not be construed as limited to the embodiments and specific details set forth herein. Like numbers refer to like elements throughout the description.

In this disclosure, although specific terminologies have been used to exemplify the invention, this should not be seen as limiting the scope of the invention to only the aforementioned communication system. With the rapid development in communications, there will of course also be future type of technologies and systems with which the present invention may be adapted.

Figure 1:
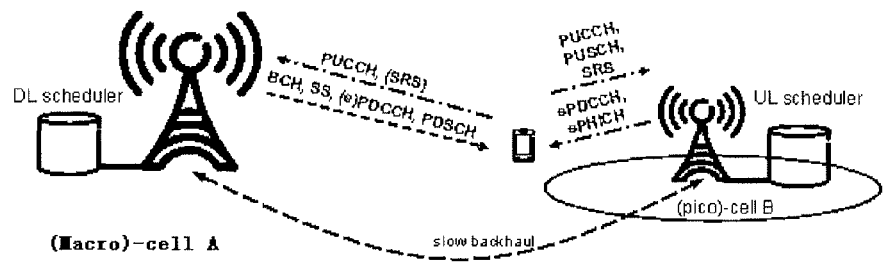
FIG. 1 illustrates an exemplary schematic scenario of decoupled DL-UL transmission in heterogeneous network.
Figure 2:
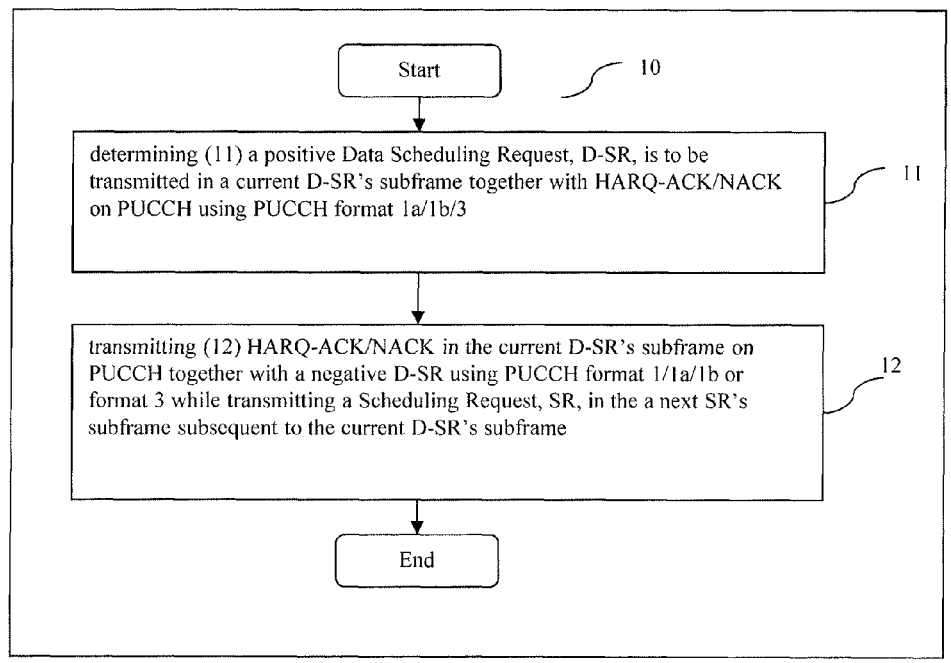
FIG. 2 illustrates an exemplary schematic flowchart of Scheduling Request (SR) transmission method for a decoupled DL-UL scenario in heterogeneous network according to an embodiment of the invention.

FIG. 2 illustrates an exemplary schematic flowchart of Scheduling Request (SR) transmission method for a decoupled DL-UL scenario in heterogeneous network according to an embodiment of the invention.

In the context of the invention, the term "heterogeneous network" generally refers to a network environment where at least two cells with different coverage and/or different transmit powers are included. The two cells are respectively in charge of the uplink and downlink communication with the UE at the edge. Generally, the cell with a larger coverage or a high transmission power is responsible for the downlink communication (for example, communication from Macro base station to UE); the cell with a smaller coverage or a low transmission power is responsible for the uplink communication (for example, communication from UE to the Pico base station). In the embodiments of the invention, as an example, two cells are respectively referred to as a Macro cell A and a Pico cell B to illustrate an exemplary heterogeneous network environment where decoupled DL-UL scenario is implemented.

As known, the physical uplink control channel (PUCCH) carries uplink control information. The physical uplink control channel supports multiple formats as shown in Table 1, such as PUCCH format 1/1a/1b/2/2a/2b/3. The selection of the formats depends on what kind of information is to be transmitted on PUCCH. For example, the physical uplink control channel (PUCCH) format 1 is a transmission channel used to carry information regarding scheduling requests (SR) in which the UE requests resources to transmit uplink shared channel (UL-SCH). For example, if the UE intends to transmit SR, format 1 may be selected. If the UE intends to transmit ACK/NACK (1 or 2 bits) or SR & ACK/NACK (1 or 2 bits), format 1a/1b may be selected. If SR & ACK/NACK (10 bits for FDD or 20 bits for TDD) is to be transmitted, format 3 may be selected. PUCCH is used to feedback uplink control information (UCI) to base station. HARQ-ACK/NACK is sent by UE to indicate whether the DL transmission is received correctly or not. Both D-SR and RA-SR can be sent by UE to inform base station that there is data to be transmitted by UE. D-SR is carried on PUCCH and RA-SR on Random Access Channel (RACH).

TABLE 1

| PUCCH format | Modulation scheme | Number of bits per subframe, $M_{bit}$ | UCI |
| --- | --- | --- | --- |
| 1 | N/A | N/A | SR |
| 1a | BPSK | 1 | ACK/NACK<br>SR & ACK/NACK |
| 1b | QPSK | 2 | ACK/NACK<br>SR & ACK/NACK |
| 2 | QPSK | 20 | ... |
| 2a | QPSK + BPSK | 21 | ... |
| 2b | QPSK + QPSK | 22 | ... |
| 3 | QPSK | 48 | SR & ACK/NACK |

In the decoupled DL-UL scenario, the downlink serving cell for UE is the Macro cell but the uplink serving cell for UE is the Pico cell. PUCCH format 1a/1b/2/2a/2b/3 may be used for transmission of HARQ-ACK/NACK which relates to the downlink transmission, thus it is expected to be received by Macro base station; while PUCCH format 1 may be used for transmission of the scheduling request (D-SR) which relates to the uplink transmission, thus it is expected to be received by the Pico base station.

There are two methods for a UE to trigger an UL transmission, D-SR and UE initiated RA-SR. In decoupled DL-UL scenario, D-SR and RA-SR are to be received by Pico base station while HARQ-ACK/NACK is to be received by Macro base station. According to one embodiment of the invention, a Scheduling Request (SR) transmission method is implemented in the heterogeneous network. The heterogeneous network comprises at least two cells in charge of downlink and uplink transmission separately. The two cells may be connected with any backhaul (regardless of small latency or long latency). The method in the embodiment may include, first, determining if a positive Data Scheduling Request, D-SR, is to be transmitted in a current D-SR's subframe together with HARQ-ACK/NACK on PUCCH using PUCCH format 1a/1b/3. If the determination is yes, i.e., the positive D-SR is to be transmitted with HARQ-ACK/NACK in the same subframe, transmitting HARQ-ACK/NACK in the current D-SR's subframe on PUCCH together with a negative D-SR using PUCCH format 1/1a/1b or format 3, and a Scheduling Request (SR)

is postponed to transmit in the next SR's subframe, in order to avoid collision caused by the positive D-SR and HARQ-ACK/NACK transmitted in a single subframe.

This may achieve the following advantages, since D-SR is postponed to the next D-SR's transmission period to transmit, the possible collide with HARQ-ACK/NACK is eliminated, thus the D-SR can be correctly detected by Pico base station and the interference caused by a large power transmitted to Macro base station using PUCCH format 1a/1b can be reduced in Pico cell in decoupled DL-UL scenario. Further, since Macro base station and Pico base station may detect correctly the signals useful for separate downlink and uplink communication respectively, and Macro base station and Pico base station do not rely closely on the in-time communication between themselves, any kinds of backhaul connected between Macro base station and Pico base station can be supported.

Preferably, transmitting a Scheduling Request, SR, in the next SR's subframe may at least include, postponing the positive Data Scheduling Request, D-SR transmission to the next D-SR's subframe on PUCCH; or transmitting a RACH scheduling request, RA-SR, in the next RA-SR's subframe instead.

The two approaches to trigger the UL transmission may be selected flexibly based on the delay that may be caused by finding the next opportunity to send the scheduling request without collision. Alternatively, transmission of a RACH scheduling request may be initiated actively by UE if a certain period of delay time (e.g., 100 ms) has lapsed since the current D-SR's subframe is transmitted.

Figure 3:
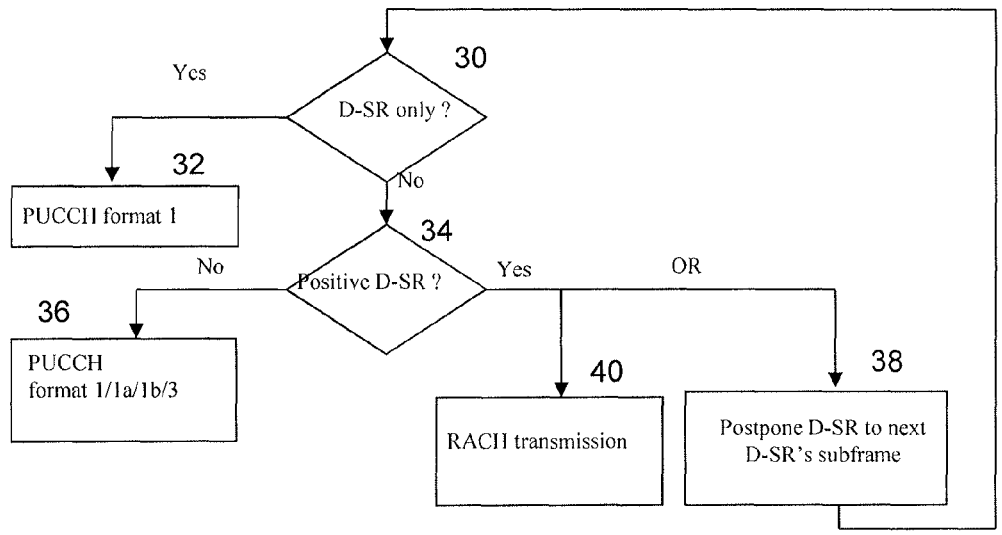
FIG. 3 illustrates an exemplary schematic diagram of a SR transmission procedure for a decoupled DL-UL scenario in heterogeneous network according to an embodiment of the invention.

FIG. 3 illustrates an exemplary schematic diagram of a SR transmission procedure for a decoupled DL-UL scenario in heterogeneous networks according to an embodiment of the invention.

The SR transmission procedure can be implemented in UE and other equivalent devices. The implementation of the embodiment may be divided into the following scenarios.

In one case (for example, a normal case), when there is no positive D-SR and HARQ ACK/NACK colliding in the same subframe at step 30, UE would follow the following manner.

If only positive/negative D-SR is transmitted in one subframe (for example, a D-SR's subframe) at step 30, there is no HARQ-ACK/NACK multiplexed with D-SR in the subframe, UE may transmit D-SR using PUCCH format 1 at step 32. Since the target receiver is Pico base station, UE may transmit the D-SR's subframe with low transmission power to save power and reduce interference to normal UEs in Pico base station. In this case, Pcio base station receiver may detect D-SR correctly.

Or, if a negative D-SR and HARQ-ACK coincides in the same subframe at step 34, PUCCH format 1a/1b is used to transmit HARQ-ACK using its own resource with high transmission power when 1 or 2-bit HARQ-ACK are transmitted and negative D-SR is transmitted using PUCCH format 1 at step 36; or HARQ-ACK and negative D-SR are jointly encoded and transmitted to Macro base station when PUCCH format 3 is used at step 36. In this way, since negative D-SR is transmitted by UE, Pico base station does not need to detect the D-SR. This will not bring any adverse effects to the UL transmission.

In another case (for example, a target case), when there is positive D-SR and HARQ-ACK colliding in the same subframe (for example, a D-SR's subframe) at step 34, UE would postpone the D-SR transmission to avoid DSR and HARQ ACK/NACK colliding at step 38.

In particular, if PUCCH format 1a/1b is used, HARQ-ACK/NACK will be transmitted on its own PUCCH resource in the current D-SR's subframe with a high transmission power to reach Macro base station and negative D-SR will be transmitted using PUCCH format 1 with a low transmission power to reach Pico base station. Then HARQ-ACK/NACK may be correctly detected on PUCCH format 1a/1b's resource by Macro base station, and Pico base station can only detect a negative D-SR.

If PUCCH format 3 is used, HARQ-ACK is encoded with a negative D-SR and transmitted to reach Macro base station with high transmission power. Then HARQ-ACK/NACK may be correctly detected on PUCCH format 3's resource by Macro base station, and Pico base station can only detect a negative D-SR in D-SR's resource.

After the transmission of the current D-SR's subframe, the UE would look for an available SR opportunity to send the Scheduling Request to Pico base station, via either scheme a) or b) below.

According to scheme a), the UE would look for another D-SR opportunity where there is no such HARQ ACK/NACK colliding, i.e., find another D-SR's subframe subsequent to the current D-SR's subframe but no collision with HARQ ACK/NACK. When it is found, positive D-SR would be transmitted using a low transmission power to reach Pico base station side, which would then start UL scheduling.

According to scheme b), the UE would look for a RA-SR opportunity where there is no such HARQ ACK/NACK Transmission on PUCCH, i.e., find a RA-SR subframe subsequent to the current D-SR's subframe but no collision with HARQ ACK/NACK. So that the UE can start a RACH procedure as a RA-SR to Pico base station at step 40, which would also start UL scheduling. It is to be noted that HARQ ACK/NACK would still prevent the RACH attempts, i.e., the UE would continue to postpone the transmission of the Scheduling Request. However, if there is a Channel Quality Indication (CQI) report on PUCCH, it would be dropped to allow RA-SR to be transmitted instead. This follows the principle of conventional PUCCH ACK/NACK (A/N), D-SR, CQI colliding solution.

Briefly, it is proposed that D-SR is not transmitted in the current subframe when colliding with HARQ ACK/NACK, but is postponed to the next D-SR's subframe without HARQ-ACK or RA-SR is transmitted to trigger an UL transmission.

The selection of scheme a) or b) may depend on different aspects and may be controlled by the network:

(1) In terms of delay, e.g., whether to use scheme a) or b) depends on which one is available earlier in time, i.e., when there is a D-SR opportunity or RA-SR available;

(2) In terms of resource and/or power consumption, e.g., scheme a) would be preferred since the RACH procedure would consume more resource and/or power.

In the embodiment, SR can be correctly detected in Pico base station and the interference to the SR detection of other UEs in Pico cell can be reduced in decoupled DL-UL scenario. Also, with this solution, uplink and downlink of UE is implemented by Macro base station and Pico base station separately which can thus support any kinds of backhaul between Macro base station and Pico base station.

Figure 4:
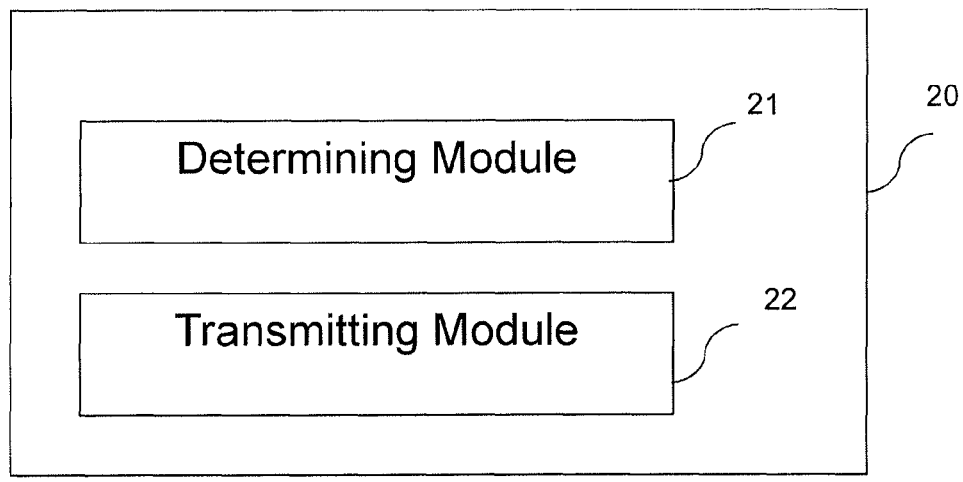
FIG. 4 illustrates an exemplary schematic diagram of a SR transmission apparatus for a decoupled DL-UL scenario in heterogeneous network according to an embodiment of the invention.

FIG. 4 illustrates an exemplary schematic diagram of a SR transmission apparatus 20 for a decoupled DL-UL scenario in heterogeneous network according to an embodiment of the invention.

The Scheduling Request transmission apparatus 20 may be implemented in a User Equipment, for example, a user mobile or other portable devices with capability of wireless communication. The apparatus may be operated in a decoupled downlink-uplink scenario in heterogeneous network. The apparatus 20 may include a determining module 21 and a transmitting module 22. The determining module 21 may be configured to detect (or determine) if there is a positive Data Scheduling Request, D-SR, and HARQ ACK/NACK colliding in the same subframe (for example, the current D-SR's subframe); if the collision is detected, the transmitting module 22 is instructed to transmit the HARQ-ACK/NACK in the current D-SR's subframe on PUCCH using PUCCH format 1a/1b/3 together with a negative D-SR, but postpone to transmit a Scheduling Request, SR, in the next D-SR's subframe (dedicated for transmission of D-SR signal) on PUCCH to avoid the collision occurred between the positive D-SR and HARQ-ACK/NACK (i.e., to be transmitted in a single subframe). The transmission of SR separated from HARQ ACK/NACK may be implemented using PUCCH format 1 with low transmission power to reach Pico base station, thus no interference from transmission of HARQ ACK/NACK will occur.

As an example, transmission of a Scheduling Request, SR, in the next subframe may include transmission of a positive D-SR or UE-initiated RA-SR. The transmitting module 22 may be further configured to postpone the positive D-SR transmission to the next D-SR's subframe on PUCCH, or to transmit a RACH scheduling request (RA-SR) in a RA-SR's subframe (subsequent to the current D-SR's subframe) instead. Preferably, whether the positive D-SR or the RA-SR will be sent may depend on the delay caused by searching for an available (i.e., no collision with HARQ-ACK/NACK in the same SR's subframe) D-SR's subframe or RA-SR's subframe without HARQ-ACK/NACK collision, or resource and/or power consumption may also be considered to make a decision. This can reduce the time to trigger UL transmission or optimize the usage of resource and/or save power.

As an example, when a collision between HARQ ACK/NACK and positive D-SR may occur in the same subframe (for example, the current D-SR's subframe), the transmitting module 22 may transmit first the HARQ-ACK/NACK on its own PUCCH resource in the current D-SR's subframe together with a negative D-SR (instead of the positive D-SR signal). The HARQ-ACK/NACK is transmitted with a high transmission power in order to reach Macro base station (for example, the base station in charge of downlink transmission) if PUCCH format 1a/1b is used. The negative D-SR is transmitted using format 1 with a low transmission power in order to reach Pico base station (for example, the base station in charge of uplink transmission). Alternatively, if PUCCH format 3 is used, the transmitting module 22 may first encode jointly and transmit the HARQ-ACK/NACK in the current subframe with the negative D-SR using a high transmission power so as to reach Macro base station. In this way, Macro base station may correctly detect the signals related to the downlink transmission, and Pico base station can only detect a negative D-SR.

As an example, the transmitting module may send separately the positive D-SR in the next D-SR's subframe or the RA-SR in the RA-SR's subframe (subsequent to the current D-SR's subframe) with a low transmission power so that it can be detected in Pico base station (not in Macro base station). Since no interference from the transmission of HARQ-ACK/NACK, the scheduling request can be detected correctly and UL transmission will be triggered as desired.

According to an embodiment of the invention, the determining module 21 in the apparatus 20 may further determine if only a Data Scheduling Request, D-SR, is to be transmitted in the current D-SR's subframe. If it is true, it will instruct the transmitting module 22 to transmit the D-SR in the current subframe using PUCCH format 1.

According to another embodiment of the invention, the determining module 21 in the apparatus 20 may further determine if a negative D-SR is to be transmitted in the current D-SR's subframe together with HARQ-ACK/NACK on PUCCH using PUCCH format 1a/1b/3. If it is true, it will instruct the transmitting module 22 to transmit the HARQ-ACK/NACK and the negative D-SR in the same current subframe using PUCCH format 1/1a/1b or format 3.

According to the embodiments of the invention, following advantages may be achieved, for example, the Scheduling Request (SR) of UE can be correctly detected by the Pico base station and the interference to the Pico cell caused by the PUCCH transmitted to the Macro cell can be reduced in the decoupled DL-UL scenario. Further, any kinds of backhaul can be supported.

It will be appreciated that the above description for clarity has described the embodiments of the invention with reference to different functional units and processors. However, it will be apparent that any suitable distribution of functionality between different functional units or processors may be used without detracting from the invention. For example, functionality illustrated to be performed by separate processors or controllers may be performed by the same processor or controllers. Hence, references to specific functional units are only to be seen as references to suitable means for providing the described functionality rather than indicative of a strict logical or physical structure or organization.

The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units and processors.

Furthermore, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate.

Furthermore, the order of features in the claims do not imply any specific order in which the features must be worked and in particular the order of individual steps in a method claim does not imply that the steps must be performed in this order. Rather, the steps may be performed in any suitable order. Reference signs in the claims are provided merely as a clarifying example shall not be construed as limiting the scope of the claims in any way.

The terminology used herein is for the purpose of describing particular embodiments only and is not intended to limit to the invention. As used herein, the singular forms "a", "an" and "the" are intended to comprise the plural forms as well, unless otherwise stated. It will be further understood that the terms "including", "comprising" and conjugation thereof when used herein, specify the presence of stated features, integers, steps, operations, elements, and/or components, but do not preclude the presence or addition of one or more other features, integers, steps, operations, elements, components, and/or groups thereof.

Although the invention has been particularly shown and described with reference to exemplary embodiments thereof, it will be understood by those skilled in the art that various changes in form and details may be made without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims.

The invention claimed is:

1. A Scheduling Request transmission method for decoupled downlink-uplink in heterogeneous network, where the heterogeneous network comprises at least two cells in charge of downlink and uplink transmission separately and connected with any backhaul, the method comprising:
   determining a positive Data Scheduling Request (D-SR) is to be transmitted in a current D-SR's subframe together with Hybrid Automatic Repeat Request-Acknowledgment/Non-Acknowledgment (HARQ-ACK/NACK) on physical uplink control channel (PUCCH) using PUCCH format 1a/1b/3;
   transmitting HARQ-ACK/NACK in the current D-SR's subframe on PUCCH together with a negative D-SR using PUCCH format 1/1a/1b or format 3 while transmitting the positive D-SR in a next SR's subframe subsequent to the current D-SR's subframe.

2. The method of claim 1, further comprises:
   transmitting the HARQ-ACK/NACK in the current D-SR's subframe on PUCCH together with the negative D-SR using PUCCH format 1/1a/1b or format 3 while postponing the positive Data Scheduling Request, D-SR transmission to the next D-SR's subframe subsequent to the current D-SR's subframe on PUCCH or transmitting a RACH scheduling request, RA-SR, in a next RA-SR's subframe subsequent to the current D-SR's subframe instead.

3. The method of claim 1, further comprises:
   transmitting, with a high transmission power, HARQ-ACK/NACK on its own PUCCH resource in the current D-SR's subframe to reach the base station in charge of downlink transmission together with the negative D-SR using format 1, with a low transmission power, to reach the base station in charge of uplink transmission, if PUCCH format 1a/1b is used; or
   jointly encoding and transmitting, with a high transmission power, the HARQ-ACK/NACK and negative D-SR in the current subframe to reach the base station in charge of downlink transmission, if PUCCH format 3 is used.

4. The method of claim 1, further comprising:
   sending, with a low transmission power, the positive D-SR in the next D-SR's subframe or the RA-SR in the next RA-SR's subframe without HARQ-ACK/NACK transmission to reach the base station in charge of uplink transmission.

5. The method of claim 4, further comprising:
   determining whether the positive D-SR or the RA-SR is sent in terms of delay caused by searching for an available D-SR's subframe or RA-SR's subframe without HARQ-ACK/NACK transmitted concurrently and/or in terms of resource and/or power consumption.

6. The method of claim 1, comprising:
   determining only a Data Scheduling Request, D-SR, is to be transmitted without HARQ-ACK/NACK on PUCCH using PUCCH format 1a/1b/3, and transmitting the D-SR in a D-SR's subframe using PUCCH format 1.

7. The method of claim 1, comprising:
   determining a negative D-SR is to be transmitted in the current D-SR's subframe together with HARQ-ACK/NACK on PUCCH using PUCCH format 1a/1b/3, and
   transmitting HARQ-ACK/NACK and the negative D-SR in the same current D-SR's subframe using PUCCH format 1/1a/1b or format 3.

8. A Scheduling Request transmission apparatus for decoupled downlink-uplink in heterogeneous network, where the heterogeneous network comprises at least two cells in charge of downlink and uplink transmission separately and connected with any backhaul, the apparatus comprising:
   a non-transitory computer readable medium storing a set of computer executable instructions; and
   a processor operable execute the set of computer executable instructions to cause the processor to:
      determine a positive Data Scheduling Request (D-SR) is to be transmitted in a current D-SR's subframe together with Hybrid Automatic Repeat Request-Acknowledgment/Non-Acknowledgment (HARQ-ACK/NACK) on PUCCH using PUCCH format 1a/1b/3;
      transmit a HARQ-ACK/NACK together with a negative D-SR in the current D-SR's subframe on PUCCH using PUCCH format 1/1a/1b or format 3, while transmitting the positive D-SR in a next SR's subframe subsequent to the current D-SR's subframe.

9. The apparatus of claim 8, wherein the processor is further configured to execute the set of computer executable instructions to cause the processor to:
   transmit the HARQ-ACK/NACK in the current D-SR's subframe on PUCCH together with the negative D-SR using PUCCH format 1/1a/1b or format 3 while postponing the positive Data Scheduling Request, D-SR transmission to a next D-SR's subframe subsequent to the current D-SR's subframe on PUCCH or transmitting a RACH scheduling request, RA-SR, in a next RA-SR's subframe subsequent to the current D-SR's subframe instead.

10. The apparatus of claim 8, wherein the processor is further configured to execute the set of computer executable instructions to cause the processor to:
    transmit, with a high transmission power, the HARQ-ACK/NACK on its own PUCCH resource in the current subframe to reach the base station in charge of downlink transmission together with the negative D-SR using format 1, with a low transmission power, to reach the base station in charge of uplink transmission, if PUCCH format 1a/1b is used; or
    jointly encode and transmit, with a high transmission power, the HARQ-ACK/NACK and the negative D-SR in the current subframe to reach the base station in charge of downlink transmission, if PUCCH format 3 is used.

11. The apparatus of claim 8, wherein the processor is further configured to execute the set of computer executable instructions to cause the processor to send, with a low transmission power, the positive D-SR in the next D-SR's subframe or the RA-SR in the next RA-SR's subframe without HARQ-ACK/NACK transmission to reach the base station in charge of uplink transmission.

12. The apparatus of claim 11, wherein the processor is further configured to execute the set of computer executable instructions to cause the processor to determine whether the positive D-SR or the RA-SR is sent in terms of delay caused by searching for an available D-SR's subframe or RA-SR's subframe without HARQ-ACK/NACK transmitted concurrently and/or in terms of resource and/or power consumption.

13. The apparatus of claim 8, wherein the processor is further configured to execute the set of computer executable instructions to cause the processor to:
   determine only a Data Scheduling Request, D-SR, is to be transmitted without HARQ-ACK/NACK on PUCCH using PUCCH format 1a/1b/3, and
   transmit the D-SR in a D-SR's subframe using PUCCH format 1 based on the determination.

14. The apparatus of claim 8, wherein the processor is further configured to execute the set of computer executable instructions to cause the processor to:
   determine a negative D-SR is to be transmitted in the current D-SR's subframe together with HARQ-ACK/NACK on PUCCH using PUCCH format 1a/1b/3, and
   transmit HARQ-ACK/NACK and the negative D-SR in the same current D-SR's subframe using PUCCH format 1/1a/1b, or format 3 based on the determination.

15. User equipment comprising the apparatus according to claim 8.

* * * * *